United States Patent [19]

Siard et al.

[11] 3,765,985

[45] Oct. 16, 1973

[54] APPARATUS FOR WELDING TWO SHEETS BY ULTRA HIGH FREQUENCY ENERGY

[75] Inventors: Michel Siard, Sainte Adresse; Michel Laurentie, Le Havre, both of France

[73] Assignee: Compagnie Francais de Raffinage, Paris, France

[22] Filed: Nov. 8, 1971

[21] Appl. No.: 196,369

[30] Foreign Application Priority Data

Nov. 6, 1970 France ............................ 7040001

[52] U.S. Cl. ............................ 156/380, 219/10.55
[51] Int. Cl. ............................ B29c 19/02, H05b 5/00
[58] Field of Search ............................ 156/380, 272; 219/10.55

[56] References Cited
UNITED STATES PATENTS

| | | | |
|---|---|---|---|
| 3,519,517 | 7/1970 | Dench | 156/380 |
| 2,358,455 | 9/1944 | Hallman | 156/380 |
| 3,528,867 | 9/1970 | Leatherman | 156/380 |

Primary Examiner—Douglas J. Drummond
Attorney—Eric H. Waters et al.

[57] ABSTRACT

Two sheets of material are heated to welding temperature by UHF energy by being first passed through a resonant cavity in which UHF energy is applied to the sheets in an overlapped region thereof whereafter the sheets are pressed together. The resonant cavity and the pressing rollers are carried on a traveling framework which is disposed in a pit, and one of the sheets is unwound as the framework travels to be overlapped onto the other sheet which is stationary and which extends over the pit at one of the edges thereof.

10 Claims, 5 Drawing Figures

Patented Oct. 16, 1973

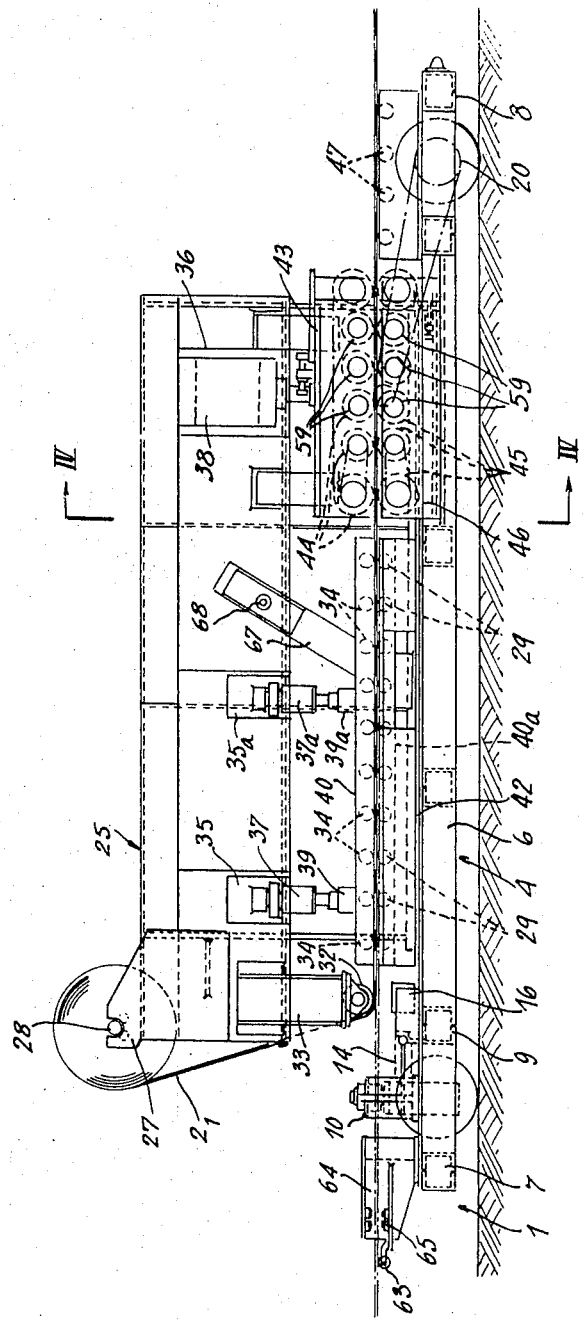

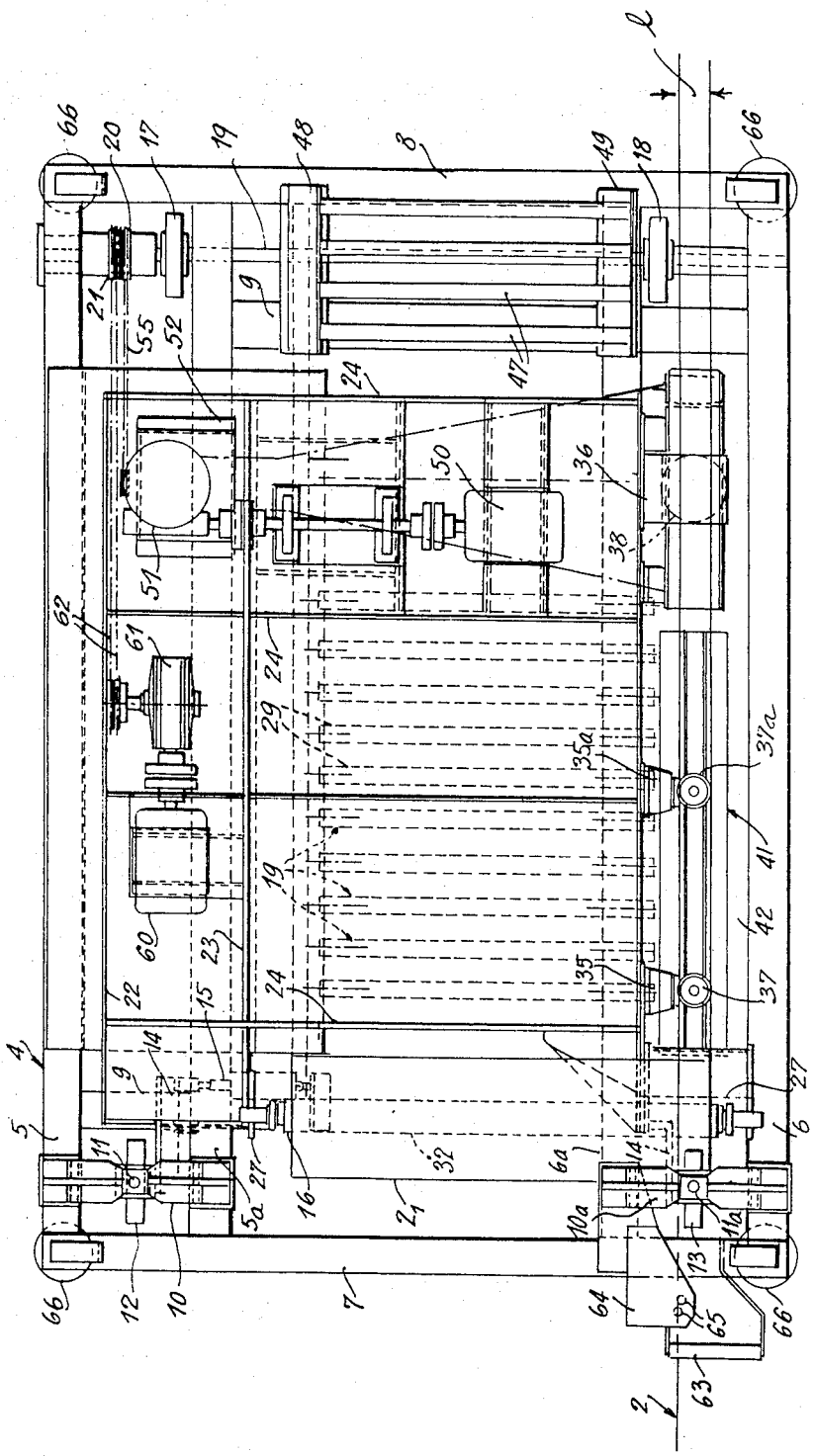

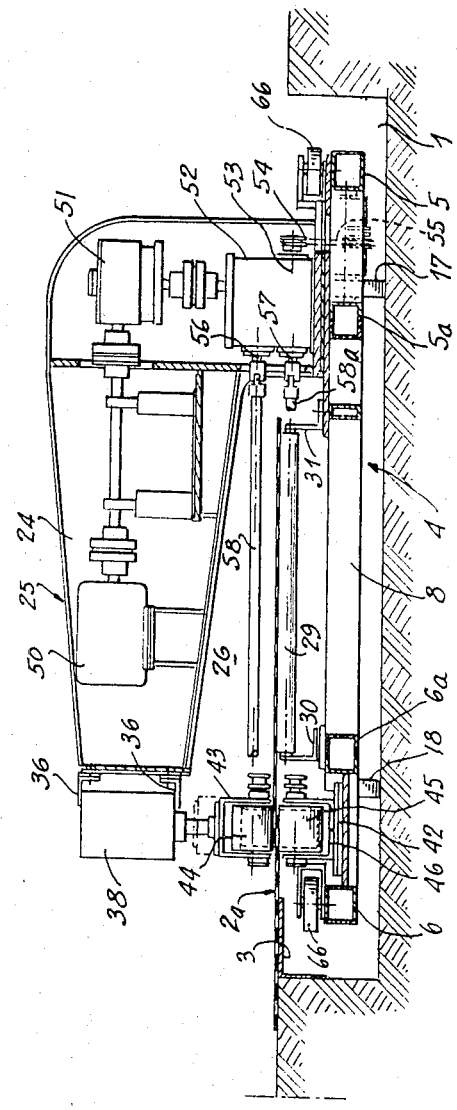

APPARATUS FOR WELDING TWO SHEETS BY ULTRA HIGH FREQUENCY ENERGY

BACKGROUND OF THE INVENTION a. Field of the Invention

This invention relates to apparatus for welding together two sheets of strips of material absorbing ultra-high frequency waves i.e., UHF whose frequency is higher than 9,000 MC/s.

b. Prior Art

The advantages offered by the heating of different dielectric substances by means of ultra-high frequency engery is well known, especially in relation to the rapid heating obtained which permits the use of relatively short installations as compared to the length of installations in which the heating of the same substances is obtained through conduction or radiation. Hitherto, however, it has proven difficult if not impossible to heat sheet products in limited strip zones thereof by means of UHF energy, since the resonant cavities have to be sealed in order to allow proper propagation of the UHF waves.

SUMMARY OF THE INVENTION

The present invention provides a device whereby it becomes possible to heat well demarked zones of sheet or strip products, especially butyl type elastomers, and by operation of the device the invention makes it equally possible to weld together extra wide sheets, the welding being effected in a region of minimum overlap of two such sheets. It therefore becomes possible in accordance with the apparatus according to this invention, to produce sheets of very great extent as required in the manufacture of leakproof sheathing for roofs, terraces and the like.

According to the invention, the apparatus comprises a resonant cavity connected to a UHF wave generator, pressing means arranged in alignment with said resonant cavity at one of the ends thereof, means for feeding and entraining a first and a second sheet whereby the sheets overlap each other partially in a zone aligned with the resonant cavity, and means for effecting simultaneous relative displacement of said resonant cavity and said pressing means with respect to said two sheets, so that the overlapping portions of those two sheets are first made to pass into said resonant cavity and then between the pressing means.

BRIEF DESCRIPTION OF THE DRAWING

An embodiment of the invention is shown, by way of non-limitative example, in the attached drawing wherein:

FIG. 2 is a side elevational view of one embodiment of the welding device of the apparatus in FIG. 1;

FIG. 3 is a plan view of the device of FIG. 2;

FIG. 4 is a sectional view taken on line IV—IV of FIG. 2; and

DETAILED DESCRIPTION

Figure 5:
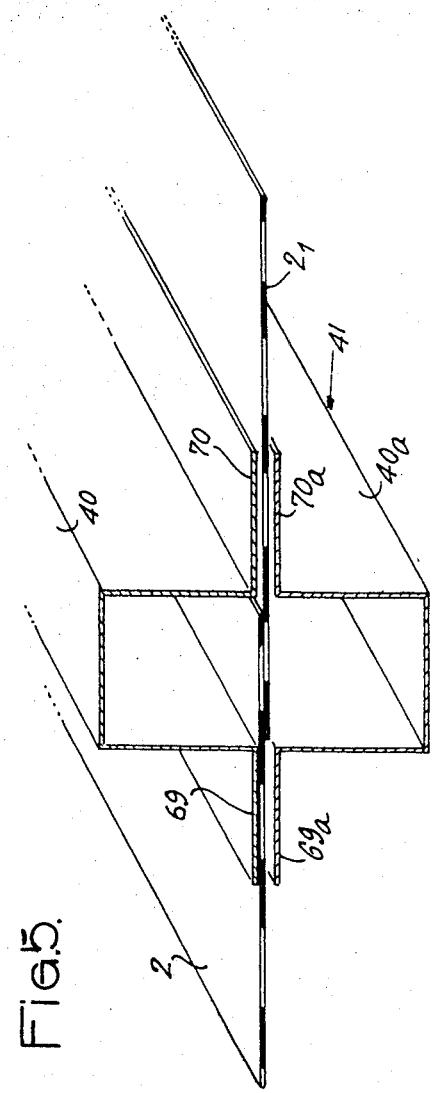
FIG. 5 is a diagrammatic perspective view of a detail of the apparatus.

In the embodiment shown in the drawing, a welding apparatus is arranged in a pit 1 whose width is slightly greater than the width of the welding device hereinafter described, and whose length is advantageously equal at least to the sum of the length of the sheets or plates to be welded together and twice the length of the welding device.

Figure 1:
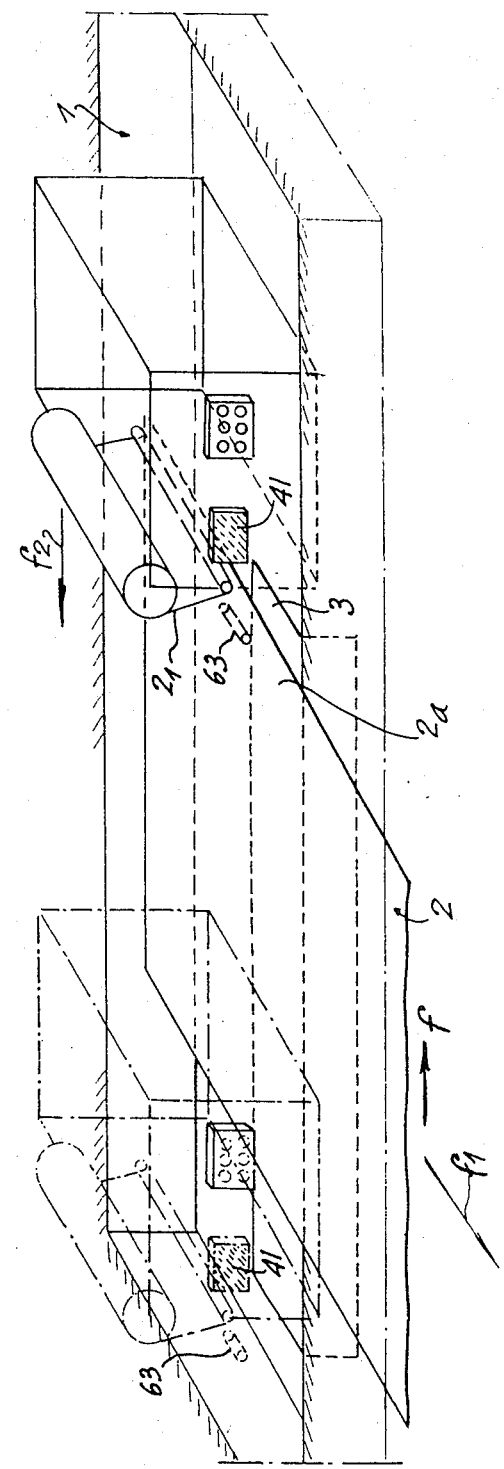
FIG. 1 is a diagrammatic perspective view showing the assembly of the welding apparatus of the invention.

As shown in FIGS. 1 and 4 a welding apparatus is arranged in pit 1, and a first sheet or plate 2 extends transversely relative to pit 1 and one edge 2a of such sheet projects over an angle support 3 at the edge of the pit. The purpose of such angle support 3 is to support sheet 2 so that the end of the edge 2a projecting beyond the support 3 is distorted as little as possible. The sheet or plate 2 can be thin and is frequently made of pliable substances such as elastomers and especially butyl sheets, the latter being one of the products which the apparatus of the invention is intended to weld.

In the illustrated embodiment, sheet 2 simply rests on the ground next to the pit, but obviously other means for its support can be employed. In particular, it is within the contemplation of the invention to provide a conveyor to facilitate movement of sheet 2 in the direction shown by arrow $f$ in FIG. 1, when a number of sheets greater than two are to be welded together in successive operations.

The welding device proper comprises, as shown in FIGS. 2-4 of the drawing, a framework denoted by reference numeral 4. The framework includes two sets of side members 5, 5a and 6, 6a joined together by front cross bars 7 and rear cross bars 8, as well as by various reinforcement members such as fitting 9 in FIGS. 2 and 3. The side members 5, 5a on the one hand and 6, 6a on the other are joined near their front ends by respective cradles 10 and 10a, wherein swivels 11, 11a are fitted for receiving wheels 12 and 13 which support the front of the framework 4. Swivels 11 and 11a are respectively connected by cranks 14, which are themselves interjoined by a driving-rod mechanism denoted by reference numeral 15, on which a steering control unit 16 is fitted. The control unit comprises a jack whose feed depends on the steering to be imposed on the wheels to be described later. The rear of the framework is supported by wheels 17 and 18 mounted on a shaft 19, which can be driven in either direction by friction wheels or chain wheels 20, 21 respectively as will be explained later.

The framework 4 carries, on the side appearing at the top of FIG. 3, cheeks 22, 23 forming a bed for transverse fittings 24 serving as a mounting for a bracket 25 (FIG. 4) extending to side member 6a and defining thereabove an open space 26 (FIG. 4). At the top of the portion of bracket 25 facing the front end of the framework there are mounted bearing fittings 27 for a shaft 28 on which is wound a sheet $2_1$ to be edge-welded to sheet 2.

As seen in FIG. 3, the position of the fitting 27 is selected so that sheet $2_1$ when unrolled partially overlaps sheet 2 over a width $l$ of the order of a few centimeters, such width depending on various factors such as, for example, the thickness of the sheets and their composition.

Numeral 29 denotes the rollers of a conveyor arranged above the framework 4 between supports 30, 31 (FIG. 4) to define a support surface for sheet $2_1$ as it is unwound from the roll. A guide roller 32 is supported beneath the side edge of the bracket 25 by a fitting 33. Roller 32 is intended to feed the sheet $2_1$ into a plane corresponding to the surface defined by the rollers 29. Preferably, as shown in FIG. 2, complementary rollers 34 are arranged in alignment above at least certain of the rollers 29, the rollers 34 being driven in rotation to insure unwinding of sheet $2_1$. As seen in FIGS. 3 and 4, the rollers 29 and 34 extend only over a part of the width of sheet $2_1$, such sheet projecting beyond the end of bracket 25 to overlap the sheet 2. The space thus left empty beyond the bracket 25 is utilized for the support of hanger bearings 35, 35a on the one hand and hanger bearing 36 on the other hand, respectively supporting jacks 37, 37a on the one hand and jack 38 on the other hand. The piston rods of jacks 37, 37a are joined, as shown in FIG. 2, to respective bearer caps 39, 39a on a movable portion 40 constituting in part a resonant cavity denoted by reference numeral 41. The cavity 41 additionally comprises a fixed part 40a fastened to a base 42 constituted, for instance, as a connector plate of the side members 6, 6a. The piston rod of jack 38 carries a cradle 43 which can be displaced vertically, the cradle being provided with press rolls 44 arranged opposite cooperating rolls 45 supported in a U-shaped cradle 46 mounted on the base 42 in longitudinal alignment with the resonant cavity 41.

Reference numeral 47 denotes a second train of rollers similar to rollers 29 and loosely fitted between supports 48, 49 (FIG. 3) to carry sheet $2_1$ to the delivery end of the welding device.

To obtain displacement of the welding device during its working cycle, there is provided, as shown in FIG. 3 and 4, a variable speed motor 50 driving, through a reduction transmission 51, a power unit 52 with a plurality of output shafts. One of the output shafts of the unit 52 is shown at 53 and drives friction or chain wheels 54 connected by belts or chains to wheel 20, to effect the driving of wheels 17, 18 carrying the framework 4. Other output shafts 56 and 57 of unit 52 are provided for driving, through intermediate shafts 58, 58a (FIG. 4), the press rolls 44 and 45 respectively, whose movement is synchronized, for example, by means of chain wheels 59.

It is preferred that at least some of the rollers 34 are driven in rotation, and for such purpose the rollers are driven from unit 52 via an output shaft for that purpose.

Reference numeral 60 denotes a second motor for driving, by means of a reducing transmission 61 and belts or chains 62, the second friction or chain wheel 21 which is keyed onto shaft 19. The second motor 60 serves for returning the welding device to its starting position after a working cycle. Such return is effected at relatively high speed as compared to the forward speed of the device during the working stroke.

To be sure that the overlap width $l$ of the two sheets 2 and $2_1$ to be welded remains uniform, the machine has at its front portion a lifter roll 63 passing beneath edge 2a of the first sheet 2 and bringing said edge into association with a locating mechanism 64 arranged in the front portion of the framework 4 and comprising, for example, a set of photoelectric cells 65 serving as an edge sensor device and operating, through a suitable control assembly well known in the art, a feed regulator of jack 16 to control steering of the guide wheels 12 and 13 supporting the front of the framework.

The guiding of the device during its return stroke does not have to be precise and the mechanism 64 is rendered inoperative as soon as the two sheets for welding are made to overlap. Freely rotatable rolls 66 (FIG. 3) are mounted at the ends of the framework 4 for contacting the side faces of pit 1.

In operation, the overlapping portions of the two sheets 2 and $2_1$ are welded by being heated in the resonant cavity 41 and squeezed between press rolls 44 and 45. As seen in FIG. 5, it has been found advantageous for the elements 40 and 40a of cavity 41 to define a rectangular-section cavity, into which opens a wave guide 67 (FIG. 2) connected to a UHF electromagnetic wave generator 68. The elements 40, 40a are provided with laterally projecting flanges 69, 70 and 69a, 70a, whose width is at least equal to one quarter of the wavelength corresponding to the excitation frequency so as to form a trap for the waves and prevent their propagation outside the resonant cavity proper, wherein the electromagnetic energy has to be absorbed as fully as possible by the overlapping edges of the two sheets 2 and $2_1$. In the case described above, it has been found advantageous to supply the resonant cavity by the TE 01 method.

With reference to FIG. 1, the first sheet 2 is initially arranged so as to project slightly beyond the support 3 and to rest at the inlet of the welding device being supported at the same time by the lift roll 63. Sheet $2_1$ is then unwound so that its end coincides with the end of sheet 2 and the sheets are overlapped by the dimension $l$ as determined by the actual position occupied respectively by the locating mechanism 64 and the support spindle 27 for sheet $2_1$. Motor 50 is next actuated while at the same time the resonant cavity 41 is excited, so that the device is automatically shifted in the direction of arrow $f_2$. The driving rollers 29 and 34 serve to unwind sheet $2_1$ which is thus progressively brought into contact with sheet 2, the overlapping portions of these two said sheets being engaged inside the resonant cavity 41 whose flanges 69, 70 and 69a, 70a (FIG. 5) are kept respectively applied to sheets 2 and $2_1$ on either side of their overlapping region through the pressure exerted by means of the jacks 37, 37a. The forward speed of the device is selected, in conjunction with the power generated in the resonant cavity 41, so that the overlapping portions of the two sheets are raised to a suitable temperature for welding. For example, in the case of butyl sheets, such temperature is between 180° and 220° C.

Upon their exit from the resonant cavity, the overlapping portions of the two sheets are squeezed by the rolls 44, 45 thus securing their welding. The two sheets are then carried by the second train of rolls 47 and are cooled to a temperature sufficient for the weld to be of such strength that there is no risk of the sheets subsequently coming apart.

The forward motion of the welding device is continued until the device reaches beyond the end of sheet 2, as shown in chain-dotted lines in FIG. 1. At the end of travel of the device, sheet 2 is cut from a roll thereof (not shown) by any suitable means. Also at the end of travel of the device, the jacks 37, 37a and 38 are energized and cavity 41 is de-excited, so that elements 40 and 40a of said cavity are separated from each other and the press rolls 44, 45 are rendered inoperative. At that instant, the motor 60 is actuated to bring the welding device back to its starting position as shown in solid lines in FIG. 1, and a new welding cycle can be executed after removal of sheets 2 and $2_1$ in the direction of arrow $f_1$ and replacement of sheet 2 by another.

The invention is not limited to the embodiment described above in detail, and various modifications can be made without exceeding the scope of the invention.

In particular, the feeding and driving members, especially for sheet 2₁ and the guiding thereof, as also the means for locating sheet 2 in position can be produced by other means known in the art.

What is claimed is:

1. Apparatus for welding together first and second sheets of material which are heated when exposed to UHF energy, said apparatus comprising a resonant cavity adapted for being connected to a UHF wave generator, pressing means in alignment with said resonant cavity at one end thereof, means for overlapping the first and second sheets in a region aligned with said resonant cavity, means for effecting simultaneous relative displacement of the said resonant cavity and said pressing means with respect to said sheets to cause the overlapping region of the sheets to pass first through said resonant cavity where the sheets are heated to welding temperature and then into the pressing means where the welded sheets are pressed together, said resonant cavity including two independent members arranged respectively on opposite sides of the overlapping region of the two sheets to be welded, said sheets passing between said members as the sheets and members undergo relative movement, each said member comprising projecting lateral flanges of a width equal to at least one quarter of the wavelength corresponding to the excitation frequency of the cavity, and means for moving one memeber of said cavity relative to the other to separate the same.

2. Apparatus as claimed in claim 1 wherein the first sheet is stationary and the resonant cavity and pressing means are displaceable with respect thereto, said apparatus further comprising means for inactivating the pressing means when the members of said cavity are separated from one another.

3. Apparatus as claimed in claim 1 wherein the first sheet is stationary and the resonant cavity and pressing means are displaceable with respect thereto, said apparatus further comprising a framework supporting said resonant cavity and said pressing means, a bracket supported by said framework and extending transversely thereof, a carrier spindle mounted on said bracket for supporting a roll of the second sheet, at least one train of carrier rollers supported on the framework beneath said bracket and extending in the same plane as the junction of the two members of the resonant cavity, said means for displacing the resonant cavity and the pressing means with respect to the sheets comprising means for driving said framework and guiding the same relative to the edge of the said first sheet.

4. Apparatus as claimed in claim 3 wherein said pressing means comprises two sets of cooperating rolls supported by said framework and arranged adjacent the resonant cavity in the direction of movement of said framework in relation to the first sheet.

5. Apparatus as claimed in claim 4 wherein one of said members of the resonant cavity and one of said sets of rolls of the pressing means are rigidly fastened to said framework, the apparatus further comprising means supporting the second member of the resonant cavity and the second set of rolls of the press means from the bracket for common movement towards and away from the overlapped region of the sheets.

6. Apparatus as claimed in claim 5 wherein said framework includes two wheel supports, at least one motor assembly for driving one of said wheel supports and means for swiveling the wheels of the other wheel support to maintain the same degree of overlap of the second sheet with respect to the edge of the first sheet.

7. Apparatus as claimed in claim 6 comprising driving rollers mounted on said framework, means for driving the said driving rollers in unison with at least some of the rollers in said train of rollers extending at the same level as the junction portion of the two members of the resonant cavity, the latter rollers and said driving rollers cooperating to advance the second sheet of material from its roll.

8. Apparatus as claimed in claim 7 comprising a second train of rollers arranged beyond the pressing means for supporting said second sheet after the sheets have been welded and are cooling.

9. Apparatus as claimed in claim 8 wherein said framework is disposed in a pit, said members of the resonant cavity defining a space therebetween which is at the same level as the ground surrounding said pit and on which the first sheet is laid flat.

10. Apparatus for welding together first and second sheets of material which are heated when exposed to UHF energy, said apparatus comprising a resonant cavity adapted for being connected to a UHF wave generator, pressing means in alignement with said resonant cavity of one end thereof, means for overlapping the first and second sheets in a region aligned with said resonant cavity, means for effecting simultaneous relative displacement of the said resonant cavity and said pressing means with respect to said sheets to cause the overlapping region of the sheets to pass first through said resonant cavity where the sheets are heated to welding temperature and thein into the pressing means where the welded sheets are pressed together, said first sheet being stationary, a displaceable framework supporting said resonant cavity and said pressing means for common displacement therewith, and means on said framework for placing the second sheet on the first sheet as the framework is displaced, the overlapped region of the sheets then passing successively through the resonant cavity and the pressing means.

\* \* \* \* \*